No. 732,899. PATENTED JULY 7, 1903.
J. SCANNELL.
CARRIAGE WHEEL JOINT SUPPORT.
APPLICATION FILED MAR. 24, 1903.
NO MODEL.

Witnesses
Martin A. Witmer
Thomas Sillers

John Scannell Inventor

No. 732,899.

Patented July 7, 1903.

UNITED STATES PATENT OFFICE.

JOHN SCANNELL, OF HELENA, MONTANA.

CARRIAGE-WHEEL JOINT-SUPPORT.

SPECIFICATION forming part of Letters Patent No. 732,899, dated July 7, 1903.

Application filed March 24, 1903. Serial No. 149,409. (No model.)

*To all whom it may concern:*

Be it known that I, JOHN SCANNELL, a citizen of the United States, residing at the city of Helena, in the county of Lewis and Clarke, State of Montana, have invented a new and useful Carriage-Wheel Joint-Support, of which the following is a specification.

My invention relates to improvements in carriage-wheel joint-supports; and the objects of my improvements are, first, to provide a joint-support for a carriage-wheel which will hold the wheel to its diameter while in use, and, second, where the joints on old wheels are settled or sagged to provide a spring-plate and T-bolt to bring the wheel and joint back to their true diameter.

Figure 1:
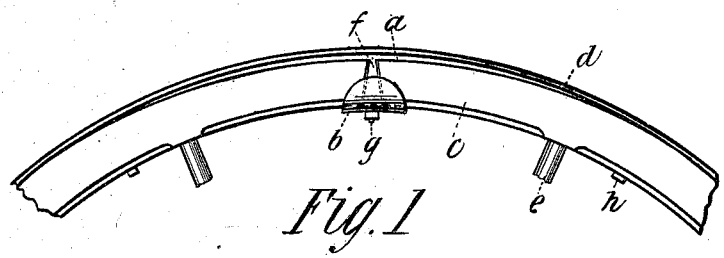
Figure 2:
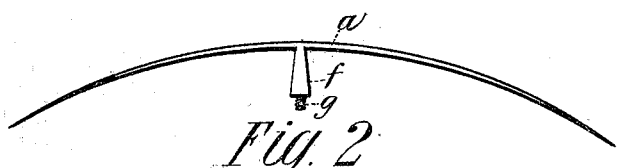
Figure 3:
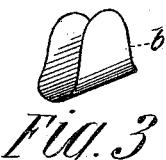
Figure 4:
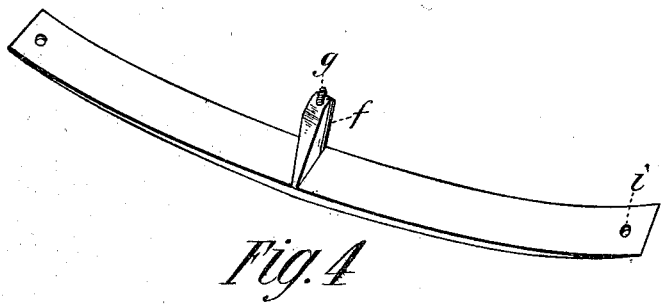

The several views of the drawings are described briefly, as follows:

Figure 1, a sectional face or side view of a wheel at a joint, shows the new support in place. Fig. 2 gives a face view of bolt, spring T-plate, and threaded shank. Fig. 3 shows the felly-plate; and Fig. 4 gives an inside view of the bolt, spring T-plate, and threaded shank.

The following is a detailed description of the several figures in the drawings:

Fig. 1, $a$ indicates spring T-plate. $b$ indicates the felly-plate. $c$ indicates the wooden rim. $d$ indicates the tire. $e$ indicates section of spoke. $f$ indicates the dovetailed or flat shank of bolt. $g$ indicates the threaded shank of bolt, and $h$ indicates bolt through tire and rim.

Fig. 2, $a$ indicates spring T-plate. $f$ indicates dovetailed or flat shank of bolt, and $g$ indicates threaded shank of bolt.

Fig. 3, $b$ indicates felly-plate.

Fig. 4, $f$ indicates dovetailed or flat shank of bolt. $g$ indicates threaded shank of bolt, and $i$ indicates a bolt-hole.

I claim as my invention, and desire to secure by Letters Patent, as follows, to wit:

In a felly-joint support, the combination with a T-shaped member, consisting of a spring-plate and an integral dovetailed shank, the shank terminating in a threaded-shank bolt, of a felly-plate, apertured to receive the shank-bolt, and a nut adapted to force the felly-plate toward the spring-plate.

In testimony whereof I have signed my name to this specification, in the presence of two subscribing witnesses, on this 18th day of March, A. D. 1903.

JOHN SCANNELL.

Witnesses:
MARTIN A. WITMER,
THOMAS SILLERS.